Figure 1:
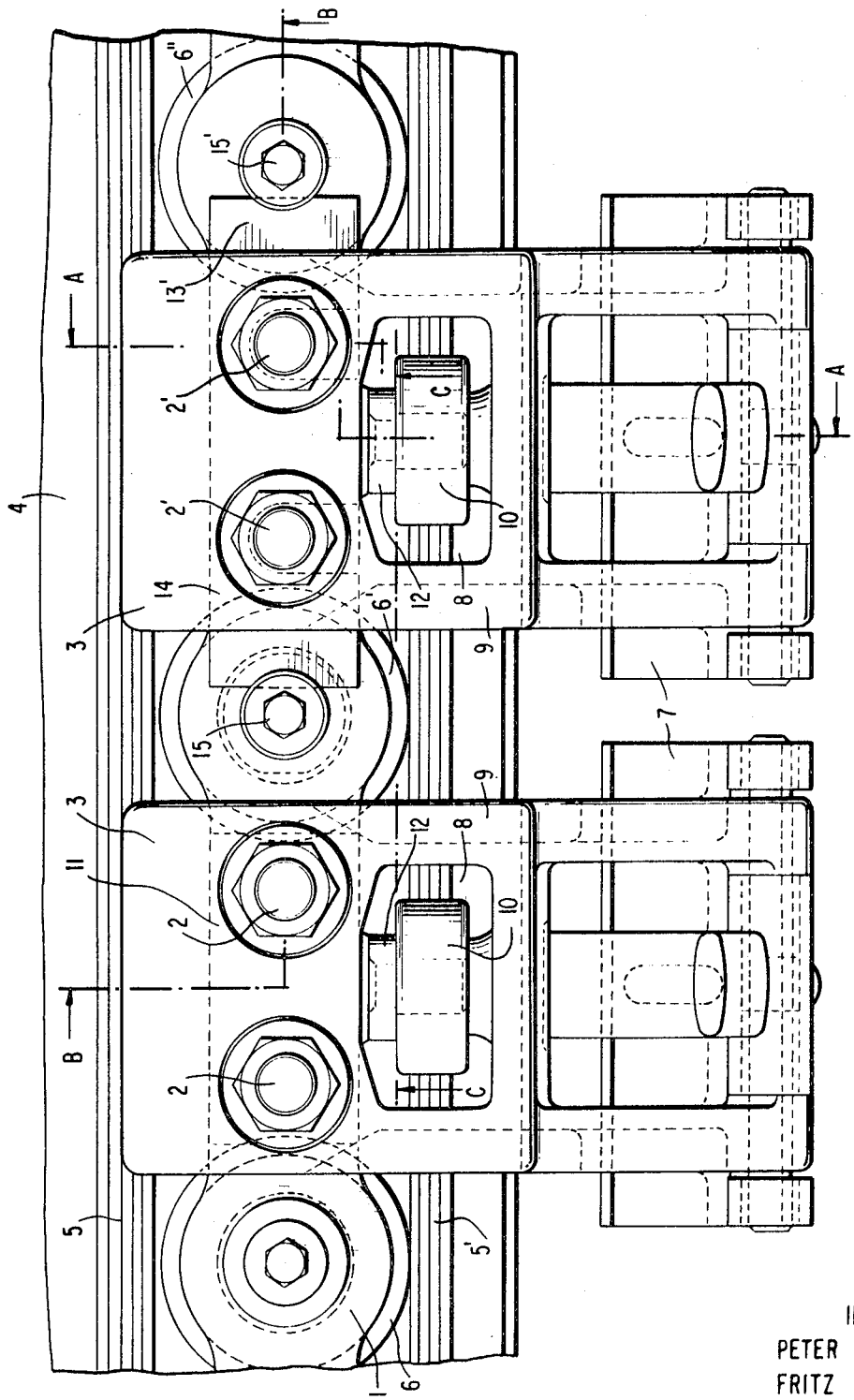

United States Patent
Dornier et al.

[15] 3,638,289
[45] Feb. 1, 1972

[54] TENTER FRAME ASSEMBLY

[72] Inventors: Peter Dornier; Fritz Gageur, both of Lindau, Germany

[73] Assignee: Lindauer Dornier Gesellschaft mbH, Lindau, Germany

[22] Filed: Oct. 17, 1969

[21] Appl. No.: 867,317

[30] Foreign Application Priority Data

May 17, 1969 Germany......................P 19 25 284.7

[52] U.S. Cl..............................26/61 B, 18/1 FB, 26/62 B
[51] Int. Cl.........................................................D06c 3/04
[58] Field of Search......................26/61 A, 61 B, 62 A, 62 B, 26/62 C; 18/1 FB, 1 FS

[56] References Cited

UNITED STATES PATENTS

| | | | |
|---|---|---|---|
| 3,123,854 | 3/1964 | Aykanian | 18/1 FB |
| 3,391,421 | 7/1968 | D'Onofrio et al. | 18/1 FB |
| 1,478,454 | 12/1923 | Renold | 26/61 B |
| 2,437,967 | 3/1948 | Nash | 26/61 B |
| 2,530,119 | 11/1950 | Dungler | 26/61 B X |
| 2,736,082 | 2/1956 | Dungler | 26/61 B |
| 3,118,212 | 1/1964 | Parkinson | 26/61 B |
| 3,457,608 | 7/1969 | Gageur | 26/61 B |
| 3,469,291 | 9/1969 | Gageur | 26/61 B |

FOREIGN PATENTS OR APPLICATIONS

| | | | |
|---|---|---|---|
| 921,737 | 1/1947 | France | 26/61 B |
| 1,028,549 | 2/1953 | France | 26/61 B |
| F16,686 | 8/1956 | Germany | 26/62 C |

*Primary Examiner*—Robert R. Mackey
*Attorney*—James E. Bryan

[57] ABSTRACT

This invention relates to a clip chain assembly for tenter clips comprising a vertical guide rail, a plurality of connected tenter clips each supporting a clip table on one side of the guide rail, first guide roller means secured to each tenter clip and being supported by the guide rail, and second guide roller means mounted between the tenter clips and contacting the side of the guide rail facing away from the clip table.

9 Claims, 5 Drawing Figures

INVENTORS
PETER DORNIER
FRITZ GAGEUR

INVENTORS
PETER DORNIER
FRITZ GAGEUR

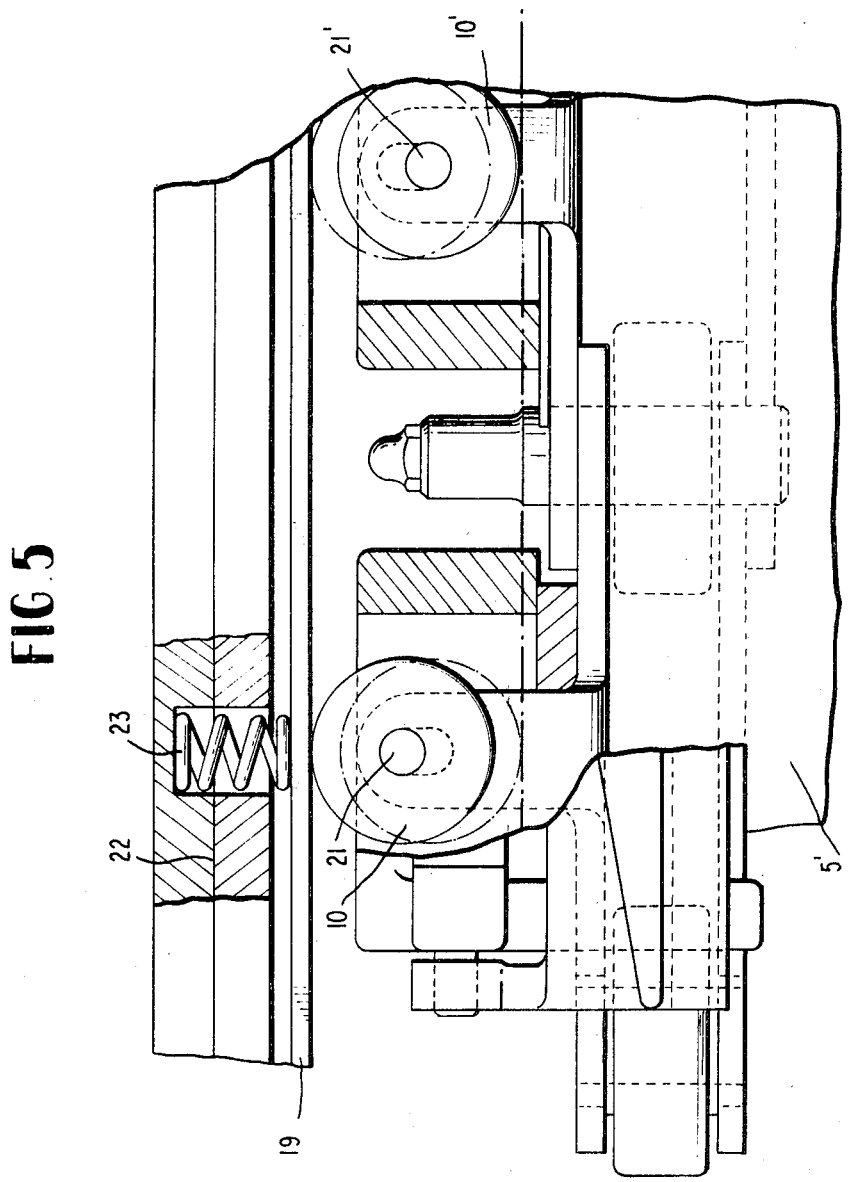

TENTER FRAME ASSEMBLY

Tenter clips with roller bearings are commonly employed in tentering frames used in the textile art and also for stretching thermoplastic foils. These clips are provided with rollers for the horizontal and vertical positioning thereof.

Due to the fact that the clip chain track assemblies are composed of several sections and, as a result of the angle and bending points or joints thereby produced, gaps are formed which considerably impair the travel or operation of the clip chain. In order to eliminate this disadvantage, a flexible jointless vertically positioned guide rail has been employed as a bearing or rolling surface for the center clips absorbing the horizontal elastic forces and the rollers bear thereagainst on both sides with a small amount of play. One set of flexible bands constitutes the flexible guide rail which eliminates any angles or points of impact, thereby imparting a quiet operation to the clip chain. Similarly, specific means are provided at the transition or junction points between two successive track sections and at the bending points in order to eliminate points of impact and to assure a quiet operation of the vertical rollers carrying the weight of the tenter clips.

In one known construction, spring steel bands clamped in as sets or bundles are mounted in an upright manner in clamping members on the chain carrier, i.e., between two angular rails. The horizontal rollers are mounted at the height of the clip table and at the height of the material to be clamped in. Mounted below the rollers and ahead of the guide rail are the chain rollers and, further, the above-mentioned vertical roller is mounted below the clip table.

Also, another construction of clip chains of this type has been proposed in which the flexible guide rails are clamped in at the side facing away from the material to be treated so that both above and below the clamping point and substantially symmetrically to the plane of the material to be treated, bearing or rolling surfaces are produced for the horizontal rollers of the tenter clips. For example, the guide rail is clamped in on a web portion mounted on the rear wall of a housing enclosing the clip chain track assembly. In this construction of the guide rail, the tenter clip has two bearing or rolling surfaces for the horizontal rollers, specifically above and below the clamping point for the flexible guide rail, and also above and below the clamping point for the material to be treated. The arrangement of the horizontal rollers may be in a triangular manner, for example. The advantage of this construction of the tenter clips, together with the manner of clamping-in the flexible guide rail, is that considerably smaller and lighter rollers may be employed and the load is very uniformly distributed. The chain rollers, with the aid of which the individual clips are linked or joined together to form a closed chain and in which the driving gears engage at the reversing points, are mounted between the rollers at the height of the clip table ahead of the guide rail. An additional advantage is that the vertical roller is no longer mounted at the clip body itself, in contrast to the first construction discussed above, but either at the chain links between two successive tenter clips or therebelow. The arrangement may be so modified that the vertical roller will be alternately positioned once on the front and once on the rear side, i.e., on the side of the connecting link facing and/or facing away from the material to be clamped in. The result will be a wider running or operating path or track for the clip chain and any tilting of the tenter clips is effectively prevented.

In these known constructions, however, the aforementioned transition elbows or curves, or transition pieces, at the bending points or joints of the chain track involve certain difficulties for they must be made to constitute a smooth bearing or rolling surface for the vertical rollers carrying the weight of the chain in any possible angular position of the adjoining chain sections. Flexible spring bands standing on edge and being let into the bearing or rolling surface of the chain track carriers have been proposed as self-adjusting transition members. According to a different known proposal, circular ring segments are provided which are positioned in corresponding constructions of the adjoining chain track carriers. Moreover, for the aforementioned construction and design of tenter clips, a larger number of rollers is needed, i.e., at least three or, for the second construction, even six horizontal rollers and at least one vertical roller are required.

The present invention provides a clip chain for use with flexible jointless and vertically clamped-in guide rails in which, particularly, the self-adjusting transition members for the vertical rollers at the bending points or joints of the chain track are eliminated, and wherein the number of horizontal and vertical rollers required is maintained as small as possible. This is attained by virtue of the fact that the tenter clips which may be placed on the upper chain links enclose the guide rail in a manner such that the guide elements carrying the weight of the clips and of the chain are positioned in or above the center of gravity of the tenter clips and of the clip chain. These guide elements are guided on the working edge of the guide rail and those guide elements absorbing the horizontal elastic forces are guided at the height of the clip table at the side of the guide rail facing away from the clip table.

The advantage of this novel construction is that in the mounting of the clips and the clip chain, in addition to the known quiet operation due to the sets of spring bands acting as the guide rail, a reduction of the otherwise customary number of guide elements carrying the weight of the clips and the chain and of the guide elements that absorb the horizontal elastic forces is effectively achieved and, by reason of the positioning of the guide elements carrying the weight of the chain, no specific junction or transition members or links are required. Furthermore, due to this reduction in weight of the clips and the entire clip chain, a further increase in the operating speed thereof is made possible. The weight reduction is attained also by virtue of the fact that the clip portion has a windowlike aperture for receiving the guide element carrying the clip and chain weight. For these guide elements of the individual clips, there results, in turn, the advantage that they have the same position of movement with respect to each other and also move in tandem on the inner guide rail acting at the same time as a supporting rail.

The clip portions are easily removable from the clip links of the clip chain. For the purpose of adjusting the vertical position of neighboring clips, spacer or separator pieces are inserted between the upper chain link ad the clip portion.

Another advantage, as compared to the prior art constructions of clip chains, resides in a further development of the present invention in which the chain studs or link pins, simultaneously acting as axles for the guide elements absorbing the horizontal elastic forces, are secured against falling out of the bores of the chain links, and against a thus-occasioned break in the chain, by means of safety strips which are inserted between the upper chain link and the clip portion, and the ends of which engage in lateral slots or grooves in the link pins.

The vertical jumping of the guide elements carrying the weight of the clips and of the chain and also the lifting-off thereof of the guide rail, which may occur at high operating speeds of the clip chain, is eliminated due to the fact that, at certain intervals, individual elements among the guide elements are mounted higher and abut against a rail or bar mounted overhead. Any lifting-off of even shorter chain sections is thus prevented since the guide elements mounted higher prevent the guide elements carrying the weight of the chain from lifting-off the working edge of the continuous guide rail.

Figure 2:
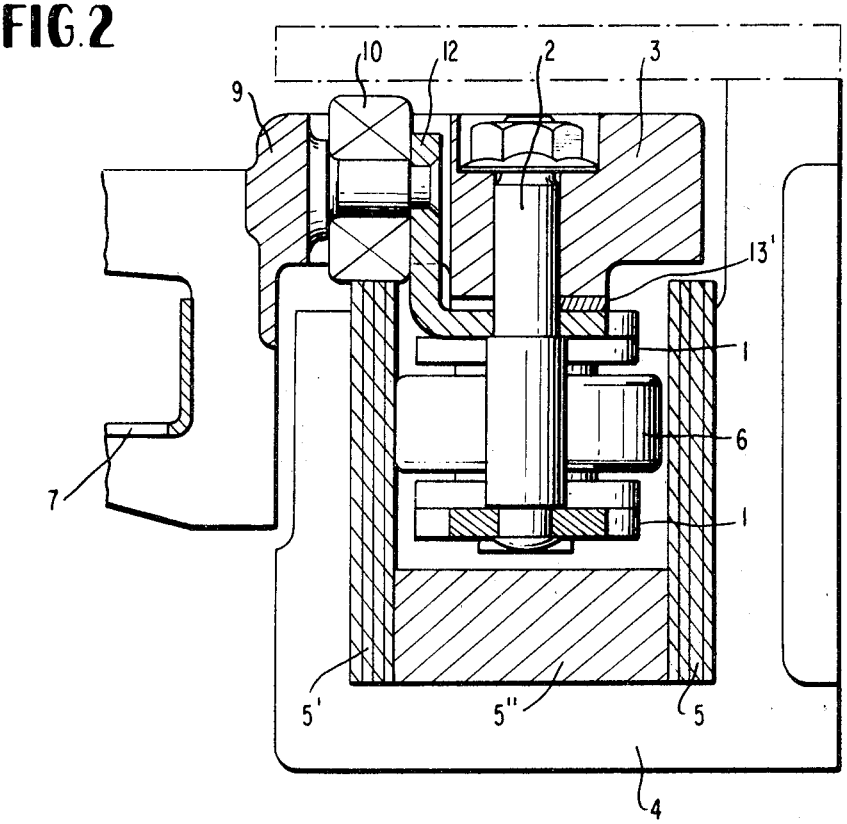

The invention will be further illustrated by reference to the accompanying drawings in which FIG. 1 is a top plan view of a section of a clip chain according to the present invention showing two tenter clips mounted thereon and two guide rails, FIG. 2 is a view in a cross section through a clip chain-guide path, a clip chain, and a clip portion.

Figure 4:
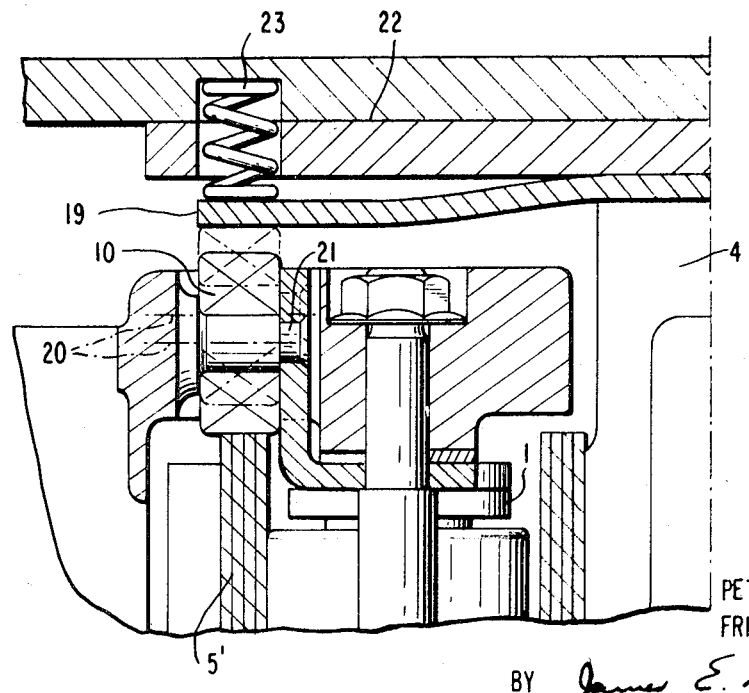
Figure 3:
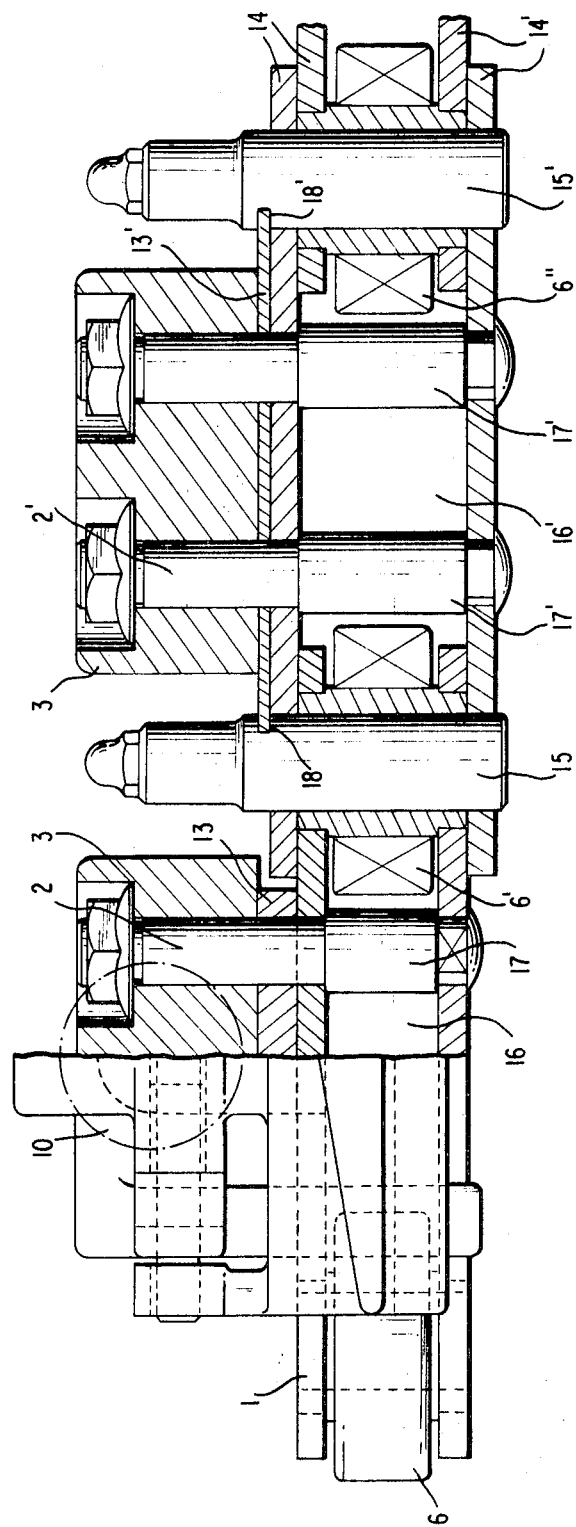
Figure 3:
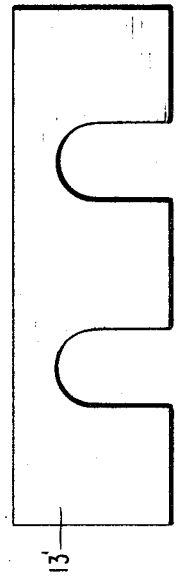

FIG. 3 is a view in longitudinal cross section through the clip chain of the present invention and showing a safety strip, FIG. 4 is a view in cross section through a part of the clip chain-guide path, a clip portion with a vertically displaceable guide element carrying the weight of the chain, and a supporting rail elastically mounted thereabove, and FIG. 5 is a side view of the clip chain with clips and with the vertically displaceable guide elements carrying the weight of the chain, with supporting rail being elastically mounted thereabove, as well as with the guide rail.

FIG. 1 shows a clip chain 1 with the tenter clips 3 being mounted thereon by means of the fastening bolts 2 and 2', together with the two jointless guide rails 5 and 5' being mounted in the U-shaped clip chain-guide path 4, between which guide rails there are positioned the guide elements 6,6', and 6" for absorbing the horizontal elastic forces and which guide elements or rollers are guided and supported during the chain operation or travel preferably on the inner guide rail 5' facing the clip table carrier 7 of the individual tenter clips 3. Also shown in the figure is the windowlike aperture 8 within the clip portion 9 which serves for receiving the guide elements or rollers 10 which carry the weight of the clips and chain and which are mounted in an upwardly angularly bent lobe 12 of the chain links 14, this lobe 12 being constructed as a carrier and secured between the chain link or member 11 and the clip 3. The guide elements or rollers 10 which carry the weight the chain are guided on the working edge of the inner guide rail 5'. Also mounted and placed on the clip 3, being shown at the right-hand side, is a safety strip 13' between the upper chain link 14 and the clip portion 3. The ends thereof engage in a slot or groove 18, 18' (FIG. 3) milled in the chain stud or link pin 15, 15' close to the plane of the upper chain link surface 14. This construction effectively prevents any falling out of the link pins 15, 15' from the bores of the chain links and hence any break in the chain 1 which might result.

The windowlike aperture 8 in the tenter clip 3 also may be so modified that instead of an aperture, the guide element or roller 10 carrying the weight of the chain is surrounded by a weblike enclosure by means of which the clip portion 3 is connected to the clip table carrier 7. The guide element or roller 10 will be mounted in any case in or above the center of gravity of the tenter clip 3.

Apparent from FIG. 2, which is cross-sectional view taken along line A—A of FIG. 1, is the interaction of the U-shaped clip chain-guide path 4 (between the two U-shaped legs of which are positioned the guide rails 5 and 5' being clamped securely in place against the clamping strip 5") with the clip chain 1, of the guide elements 6 absorbing the horizontal elastic forces, of the tenter clip 3 and of the clip portion 9 with the fastening bolts 2, the safety strip 13', the upwardly angularly bent lobe 12 being constructed simultaneously as a carrier for the guide element, as well as the guide element or roller 10. It is also apparent from this figure that the clip table 7 and the plane thereof coincides with the centerline and plane of the guide element or roller 6.

FIG. 3 shows the clip chain 1 in a sectional view taken FIG. line B—B of FIG. 1. Shown in this figure are the fastening bolts 2 and 2' with the spacer or separator pieces 13 and 13', these fastening bolts 2, and 2' being required for fastening the clip portions 3 on the clip chain 1 and having varying lengths in view of the different structural heights of the neighboring chain members 16 and 16'. Also shown in this FIG. are the chain bolts or link pins 15 and 15' together with the guide elements 6, 6', and 6" carried thereby. It is also apparent from this FIG. that the safety strip 13', shown below the clip chain 1, is mounted between the upper chain link 14 and the clip 3 and engages, for reasons of safety, with the ends thereof in the slots 18 and 18' in the link pins 15 and 15', respectively.

FIG. 4 is a detail of a cross-sectional view A—A of figure 1 already described above in connection with FIG. 2. Also shown in this figure is the elastically positioned supporting rail 19 being mounted over the guide element or roller 10. Guided thereon are the guide elements or rollers 10 mounted with their axles 20 in vertical bearings corresponding to an oblong hole 21 and 21' (FIG. 5) and being positioned either higher or lower at certain specific intervals which are dependent upon the jumping frequency arising during the high-speed operation of the chain slip 1 and the guide elements or rollers 10 thereof, and which are damped in case of any possible lifting-off and pressed against the inner guide rail 5' and the supporting rail 19 mounted overhead. This supporting rail 19 may be constructed as a narrow spring band extending along the chain-guide path 4 and corresponding at least to the width of the guide element or roller 10, or it may be constructed as a spring leaf 19 (as shown in FIG. 4) being clamped into one side in the cover means 22 of the chain-guide path 4 oppositely with respect to the guide elements or rollers 10. The bearing pressure of the supporting rail 19 against the guide elements or rollers 10 may be enhanced by means of an additional spring of springs 23.

FIG. 5 is a cross-sectional view taken along line C—C of FIG. 1 and has been further explained in connection with FIG. 4. Shown therein is the vertical displacement of the guide elements or rollers 10 and 10' in their vertical oblong holes 21 and 21', which are constructed as bearings. Also shown therein is the selective positioning of the guide elements 10 and 10' both upon the guide rail 5' and against the elastically mounted supporting rail 19 overhead and upon the spring leaf 19 as shown in FIGS. 4 and 5 which is supported by the additional spring 23 contained in the cover means 22.

It will be obvious to those skilled in the art that many modifications may be made within the scope of the present invention without departing from the spirit thereof, and the invention includes all such modifications.

What is claimed is:

1. A tenter frame assembly comprising a vertical guide rail, a plurality of connected tenter clips forming a clip chain, each supporting a clip table on one side of the guide rail, first guide roller means secured to each tenter clip in plane of gravity of the entire clip and being supported by the top of the guide rail at a greater height than said clip table, and second guide roller means mounted between the tenter clips and contacting the side of the guide rail facing away from the clip table.

2. A tenter frame assembly according to claim 1 in which the second guide roller means is mounted at the same height as the clip table.

3. A tenter frame assembly according to claim 1 in which the first and second guide roller means are mounted vertically and horizontally, respectively.

4. A tenter frame assembly according to claim 1 in which the guide rail has a U-shape over at least a portion thereof.

5. A tenter frame assembly according to claim 1 including chain links and link pins, strip means inserted between an upper chain link and the clip, the ends of said strip means engaging in lateral slots in said link pins.

6. An assembly according to claim 1 including a windowlike aperture in the clip body in which said first guide roller means is positioned.

7. An assembly according to claim 1 including means whereby some of the first guide roller means are mounted higher than the others, and further including a resilient overhead rail abutting against said higher-mounted rollers.

8. An assembly according to claim 7, in which the resilient overhead rail is a band clamped at one side, and further including cover means for the clip chain.

9. A tenter frame assembly according to claim 8 including resilient means biasing the overhead rail.

* * * * *